Ray & Shalters.
Mower.
Nº 2230 Reissued Apr. 17, 1866
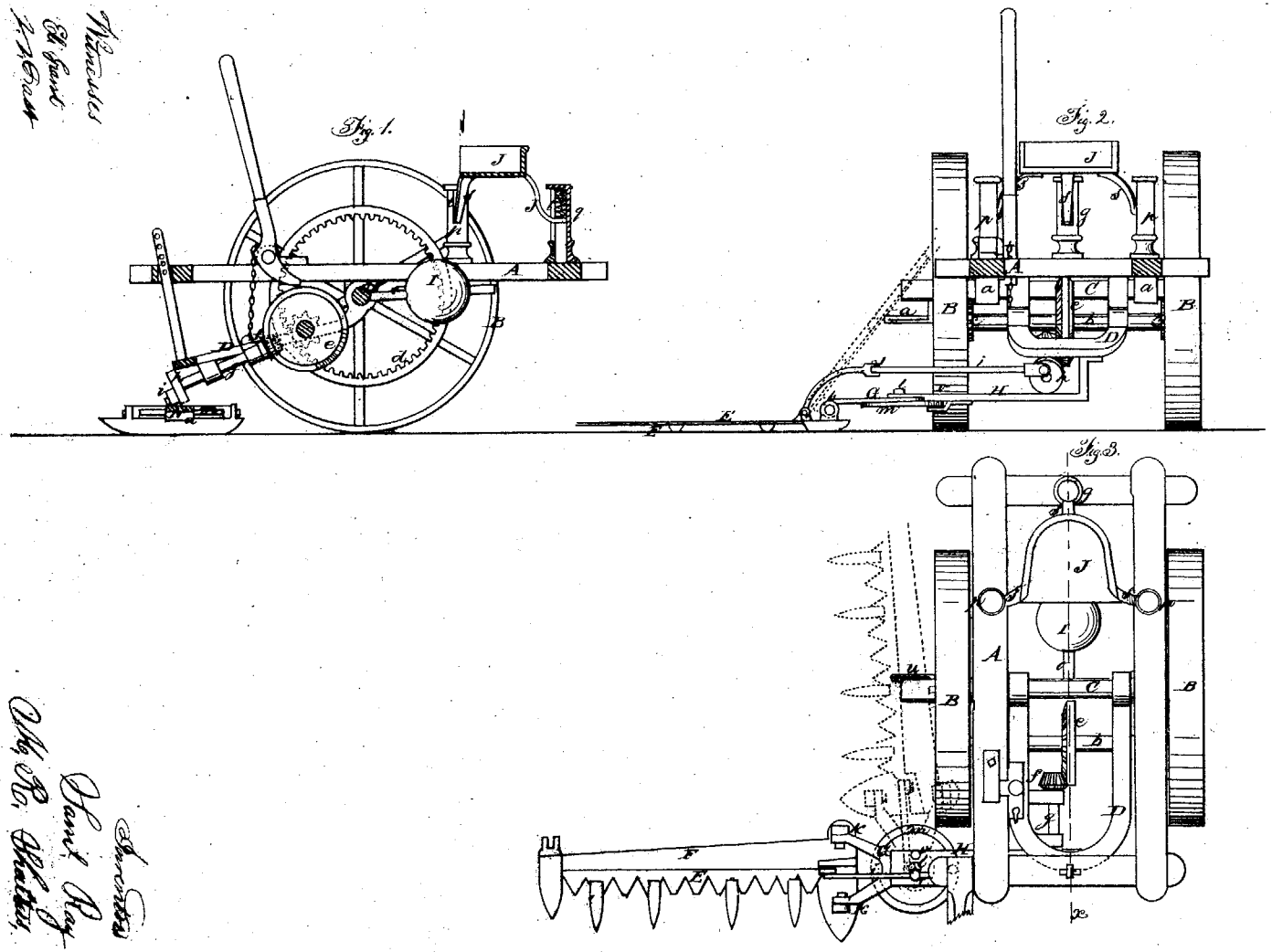
Witnesses
Eli Grant
J. H. Grant
Inventors
Saml. Ray
Ms. R. Shalters

UNITED STATES PATENT OFFICE.

JOHN F. SEIBERLING, OF DOYLESTOWN, OHIO, ASSIGNEE OF S. RAY AND M. R. SHALTERS.

IMPROVEMENT IN HARVESTING-MACHINES.

Specification forming part of Letters Patent No. 23,707, dated April 19, 1859; Reissue No. 2,230, dated April 17, 1866.

*To all whom it may concern:*

Be it known that SAMUEL RAY and MOSES R. SHALTERS, both of Alliance, in the county of Stark, Ohio, have invented a new and useful Improvement in Mowers and Harvesters; and I do hereby declare that the following is a full and exact description thereof, reference being had to the accompanying drawings, and to the letters of reference marked thereon.

In the accompanying drawings, Figure 1 represents a vertical section of a machine with RAY and SHALTERS'S improvements attached, the same being a vertical section of the machine taken in the line *x x*, Fig. 3. Fig. 2 is a front view of the machine, the cutter-beam being shown folded up in red lines. Fig. 3 is a top view, the cutter-beam being shown in red lines folded in the side of the main frame.

The invention of RAY and SHALTERS consists in horizontally folding the finger-beam either backward or forward, and in the hinge or devices employed to hold the beam in working position, and also allow such folding; and, secondly, in a peculiar arrangement of the driver's seat. These improvements of RAY and SHALTERS may be applied to different machines with the finger-beam in front or rear, as may be desired.

In the accompanying drawings, the main frame is shown at A mounted on two wheels, B B, and their axle C. A bow-shaped bar, D, is fixed to the axle and supports the gearing, which is counterpoised by a weight, I, on the rod *o*. The main frame vibrates freely upon the axle, to which it is connected by loose bearings *a*. Two cog-wheels, *d*, Fig. 1, gear into two pinions, *c*, thus transmitting motion from the traveling wheels to the shaft *b*, which, carrying an oblique gear-wheel, *e*, Fig. 1, gives motion to the pinion *f*, shaft *g*, and crank-wheel *h* for operating the connecting-rod *i* and cutters. The bar D carries an arm, H, to which is pivoted a forked hinge-plate, G, turning on the pivot *l*. To the forks of this plate is riveted a ring-bearing, *m*, which rides freely round between the bar H and hook *n*, Fig. 2. The rotation of the plate G and finger-beam is indicated by red lines, Fig. 3. Another hinge is indicated at *k k*, allowing the finger-beam to rise and fall with the undulations of the ground or to fold up, as seen in red lines, Fig. 2. Thus the finger-beam may fold backward and also upward, and by unhooking the connecting-rod it may fold forward. The plate G and finger-beam are fixed or prevented from turning by means of a pin, *v*, and when folded back the beam may rest on the hook *u*, thus relieving the side draft in transportation. The driver's seat rests on spiral springs *r*, Fig. 1, working in hollow posts *p p* and *q*. The strong broad hinge or devices for horizontal folding may be varied and yet efficiently perform the same function or movement, which is the chief feature of RAY and SHALTERS'S invention. They do not claim the vertical folding separate from the horizontal folding.

Having thus fully described RAY and SHALTERS'S invention, what is claimed as their invention is—

1. Combining the finger-beam with the machine by means of a hinge-joint so arranged as to allow the finger-beam or cutting apparatus to be horizontally folded to a position or line at a right angle, or nearly so, to the working position of said beam for the purpose of transportation.

2. Attaching the finger-bar F to the machine by means of the plate G, one end of which is pivoted to the machine, as at *b*, and the other end connected with the finger-bar by joints *k k*, the above parts being in connection with a jointed connecting-rod, *i*, to admit of the folding and turning of the finger-bar, substantially as described.

3. Placing the driver's seat J on the springs *r*, fitted in the hollow standards *p p q*, substantially as and for the purposes set forth.

JOHN F. SEIBERLING.

Witnesses:
SAMUEL H. MILLER,
W. G. MYERS.